(12) United States Patent
Yoshinaga et al.

(10) Patent No.: US 8,362,187 B2
(45) Date of Patent: Jan. 29, 2013

(54) PHENOL RESIN POWDER, METHOD FOR PRODUCING THE SAME, AND PHENOL RESIN POWDER DISPERSION LIQUID

(75) Inventors: Naoto Yoshinaga, Hofu (JP); Yoshiharu Wakayama, Hofu (JP); Satoshi Ibaraki, Osaka (JP); Jun Shimomura, Hofu (JP); Yoshimi Murage, Hofu (JP)

(73) Assignee: Air Water Inc., Hokkaido (JP)

( * ) Notice: Subject to any disclaimer, the term of this patent is extended or adjusted under 35 U.S.C. 154(b) by 221 days.

(21) Appl. No.: 12/311,073

(22) PCT Filed: Oct. 12, 2007

(86) PCT No.: PCT/JP2007/069929
§ 371 (c)(1),
(2), (4) Date: Mar. 18, 2009

(87) PCT Pub. No.: WO2008/047702
PCT Pub. Date: Apr. 24, 2008

(65) Prior Publication Data
US 2010/0086782 A1    Apr. 8, 2010

(30) Foreign Application Priority Data
Oct. 20, 2006  (JP) .................................. 2006-286279

(51) Int. Cl.
*C08G 61/02*   (2006.01)
(52) U.S. Cl. ........ 528/86; 429/231.8; 252/511; 361/502
(58) Field of Classification Search .................... 528/86; 429/231.8; 252/511; 361/502
See application file for complete search history.

(56) References Cited

U.S. PATENT DOCUMENTS

| 4,788,236 A | 11/1988 | Kopf |
| 2001/0002246 A1* | 5/2001 | Huguenin et al. ............. 423/511 |

FOREIGN PATENT DOCUMENTS

| JP | 48-13942 | 5/1973 |
| JP | 50-98537 | 8/1975 |
| JP | 58-74711 | 5/1983 |
| JP | 58-111822 | 7/1983 |
| JP | 58-118812 | 7/1983 |
| JP | 59-80437 | 5/1984 |
| JP | 61-51019 | 3/1986 |
| JP | 2-167327 | 6/1990 |

(Continued)

OTHER PUBLICATIONS

Notice of Grounds for Rejection Japanese Patent Application No. 2006-286278 mailed Jul. 17, 2012.

(Continued)

*Primary Examiner* — Shane Fang
(74) *Attorney, Agent, or Firm* — Foley & Lardner LLP (57) ABSTRACT

Disclosed is a thermofusible and thermosetting phenol resin powder having an average particle diameter of not more than 20 μm and a single particle ratio of not less than 0.7. This phenol resin powder preferably has an average particle diameter of not more than 10 μm, a variation coefficient of the particle size distribution of not more than 0.65, a particle sphericity of not less than 0.5 and a free phenol content of not more than 1000 ppm. Also disclosed are a dispersion liquid of such a phenol resin powder, and a method for producing a phenol resin powder having such characteristics.

11 Claims, 3 Drawing Sheets

FOREIGN PATENT DOCUMENTS

| | | |
|---|---|---|
| JP | 7-18043 | 1/1995 |
| JP | 10-338729 A | 12/1998 |
| JP | 2001-143973 | 5/2001 |
| JP | 2001-240645 | 9/2001 |
| JP | 2004-149656 | 5/2004 |
| JP | 2004-189587 | 7/2004 |
| JP | 2005-105090 * | 4/2005 |
| JP | 2006-324183 | 11/2006 |
| JP | 2007-180429 | 7/2007 |
| JP | 2008-030981 | 2/2008 |

OTHER PUBLICATIONS

Notice of Grounds of Rejection in JP Appln No. 2007/214781, dated Nov. 29, 2011.

* cited by examiner

PHENOL RESIN POWDER, METHOD FOR PRODUCING THE SAME, AND PHENOL RESIN POWDER DISPERSION LIQUID

TECHNICAL FIELD

The present invention relates to a phenol resin powder possessing thermofusibility and a thermosetting property and a method for producing the same, as well as a phenol resin powder dispersion liquid. The thermofusible phenol resin powder and the dispersion liquid thereof according to the present invention can be suitably employed as additives for materials over various industrial fields such as a molding material, a paint, a refractory, papermaking, a friction material, an abrasive and an adhesive.

BACKGROUND ART

A phenol resin is a material excellent in the balance between heat resistance, dynamical performance and electric characteristics and the cost, and utilized in various industrial fields. In particular, applicability to various fields has recently been found as to a granular or powdery phenol resin possessing thermofusibility and a thermosetting property, and some products are already put on the market as multiuse materials. For example, Japanese Patent Laying-Open No. 58-111822 (Patent Document 1) discloses a granular or powdery thermosetting phenol resin consisting of a condensate of a phenolic compound and formaldehyde, and this is put on the market with a trade name "Bellpearl (registered trademark) Type S" (by Air Water Inc.).

In general, the aforementioned thermosetting phenol resin powder is employed singly or in a state mixed with another material to be shaped and hardened. Shaping denotes an operation of heating, melting and compression-molding a solid (powdery, for example) thermosetting phenol resin or molding a thermosetting phenol resin dissolved in an organic solvent to be liquefied by an operation such as cast molding or impregnation. However, shaping employing a liquefied phenol resin containing an organic solvent had a problem of influence on safety and the environment resulting from the organic solvent.

In such a context, a technique of not liquefying a thermosetting phenol resin with an organic solvent but dispersing a thermosetting phenol resin powder in water for liquefying the same and employing this as a raw material for shaping has recently been proposed. According to such a water dispersion liquid, the influence exerted on safety and the environment due to the organic solvent is avoided.

When powder-mixing a thermosetting phenol resin powder with another material and shaping this, it is required that the mixing with another material is homogeneously performed in a short time, and it is required for this purpose that the thermosetting phenol resin powder can be impregnated into fine clearances of the other material with low resistance. When preparing a water dispersion liquid from the thermosetting phenol resin powder and shaping this, it is required that the same can be rapidly and homogeneously dispersed in water and the water dispersion liquid has low viscosity, i.e., is easily flowable also in a high concentration region. When shaping a composite of this water dispersion liquid and another material, further, it is required that the water dispersion liquid can be so easily impregnated into clearances of the other material that mixing is homogeneously and rapidly performed.

In order to satisfy the aforementioned requirements, the shapes and modes of particles of the thermosetting phenol resin must be properly controlled. In other words, it is required that (i) the average particle diameter of the particles is sufficiently small, and (ii) there is hardly any secondary aggregate resulting from aggregation of primary particles, in order to attain easiness in mixing with the other material and low viscosity of the water dispersion liquid. When also taking account of dispersibility in water and low viscosity of the water dispersion liquid, it is more desirable that (iii) the particle size distribution of the particles is sufficiently narrow, and/or (iv) the shapes of the particles are closer to a spherical shape, in addition to the above (i) and (ii). The aforementioned sufficiently small particle diameter must be at least not more than 20 μm, more preferably not more than 10 μm, in consideration of application of the phenol resin powder or a hardened substance thereof to various industrial uses.

Further, while a resin having low melt viscosity or low solution viscosity has been generally preferably used as a thermosetting phenol resin due to such advantages that a molding pressure can be reduced and a dense and excellent mixed state can be formed with another material, for example, such a low-viscosity thermosetting phenol resin generally contained large quantities of a highly toxic monomer phenol and a low condensation component, and had a problem in safety and environment. Therefore, development of a thermosetting phenol resin containing no such monomer phenol etc. or having an extremely small content of monomer phenol etc. has been strongly awaited.

However, although a large number of studies have been heretofore conducted as to the thermosetting phenol resin powder, it is the present situation that a thermosetting phenol resin powder having the aforementioned characteristics is not yet known and a production method suitable for mass production of such a thermosetting phenol resin powder is not yet known either.

For example, the aforementioned Patent Document 1 describes a technique of obtaining a granular or powdery thermosetting phenol resin by optimizing synthetic conditions such as the ratios of quantities of formaldehyde, phenol, hydrochloric acid and a water medium as used and a temperature condition, and the obtained thermosetting phenol resin contains neither a harmful phenol monomer nor a low-molecular condensation component, and has high safety. However, the thermosetting phenol resin had such points to be improved that (i) the primary particle diameters are relatively large, (ii) the quantity of secondary aggregates formed by aggregation of the primary particles is relatively large, (iii) the particle size distribution is wide, and (iv) the resin contains a large quantity of particles having shapes other than a spherical shape.

Japanese Patent Laying-Open No. 2-167327 (Patent Document 2) describes a technique of producing a pulverized phenol resin by dissolving a phenol resin in an organic solvent, thereafter adding a protective colloid solution consisting of a catalyst, a hydrophilic polymer compound and an aldehyde thereto and performing reaction. However, the phenol resin obtained by this method has a relatively large average particle diameter of 50 to 500 μm (refer to Example). Further, the production method has a problem in safety and environment in the point that the organic solvent is employed.

Japanese Patent Laying-Open No. 50-98537 (Patent Document 3) describes a technique of obtaining an unhardened phenol resin powder by adding a cellulosic compound to an initial condensate obtained by reacting a phenolic compound and a formaldehyde in the presence of at least either an acidic catalyst or a basic catalyst and a catalyst of a nitrogen-containing compound, granulating the mixture by further continuing the reaction and thereafter dehydrating/drying the mixture. However, this phenol resin powder has an extremely large average particle diameter of about 1 mm. Further, the resin contains about 5.1% of free phenol, and is to be improved in view of safety.

Japanese Patent Laying-Open No. 58-74711 (Patent Document 4) describes a method for producing solid resol-type phenol resin powder by obtaining an initial condensation product by heating a mixture of a phenolic compound, an aldehyde and a nitrogen-containing compound catalyst, thereafter granulating the same by adding a cellulosic compound or an aqueous polymer compound while maintaining the same in a prescribed temperature region and then keeping the reaction system acidic. However, the phenol resin particles have a large average diameter of 200 μm to 1 mm, and contain a large quantity of free phenol.

Japanese Patent Laying-Open No. 59-80437 (Patent Document 5) describes a method of dispersing a reaction condensate of an aldehyde compound and a phenol compound with a dispersant, solidifying the condensate by a method of cooling the same below the melting point or the like to granulate the condensate. However, resin particles obtained by this method have large particle diameters of about 75 to 400 μm, and the particle size distribution is also wide.

Japanese Patent Laying-Open No. 61-51019 (Patent Document 6) discloses microspherical resol resin particles covered with inorganic salts insoluble in water and a production method of rendering the inorganic salts insoluble in water coexistent in condensation reaction. However, the microspherical resol resin particles have a large average particle diameter of about 40 to 80 μm. Further, the resin particles have such a problem that a rate of dispersion in water is slow when the particles covered with the inorganic salts insoluble in water are used as a water dispersion liquid.

Japanese Patent Laying-Open No. 2004-149656 (Patent Document 7) describes a spherical rosin-modified phenol resin having an average particle diameter of 0.1 μm to 10 μm and a method for producing a spherical rosin-modified phenol resin by emulsifying a rosin-modified phenol resin dissolved in an organic solvent with water and an emulsifier and thereafter performing solid-liquid separation. However, this spherical rosin-modified phenol resin has such problems that the strength and heat resistance of the phenol resin are insufficient due to the rosin-modification of the resin and the residual carbon ratio is so low that the use is restricted to a specific use such as a binder for printing ink or the like. As to the production method, further, such points are problematic that an aromatic solvent is employed and the application is restricted to a rosin-modified resin having a self-emulsifying function.

Patent Document 1: Japanese Patent Laying-Open No. 58-111822
Patent Document 2: Japanese Patent Laying-Open No. 2-167327
Patent Document 3: Japanese Patent Laying-Open No. 50-98537
Patent Document 4: Japanese Patent Laying-Open No. 58-74711
Patent Document 5: Japanese Patent Laying-Open No. 59-80437
Patent Document 6: Japanese Patent Laying-Open No. 61-51019
Patent Document 7: Japanese Patent Laying-Open No. 2004-149656

DISCLOSURE OF THE INVENTION

Problems to be Solved by the Invention

The present invention has been proposed in consideration of such a situation, and an object thereof is to provide a phenol resin powder, possessing thermofusibility and a thermosetting property, having a minute average particle diameter, containing no secondary aggregates, consisting of particles having a spherical shape, having a narrow particle size distribution, having a small free phenol content and having high safety and a method for producing the same.

Means for Solving the Problems

As a result of deep studies, the inventors have found that a phenol resin powder, possessing thermofusibility and a thermosetting property, having the aforementioned excellent characteristics can be obtained by reacting an aldehyde and a phenolic compound in an aqueous medium with an acidic catalyst of a high concentration in the presence of a protective colloidal agent, and completed the present invention. In other words, the present invention is as follows:

The phenol resin powder according to the present invention is a phenol resin powder, possessing thermofusibility and a thermosetting property, having an average particle diameter of not more than 20 μm and a single particle ratio of at least 0.7. The average particle diameter is preferably not more than 10 μm. The definitions of the terms "thermofusibility", "thermosetting property", "average particle diameter" and "single particle ratio" are described later.

In the phenol resin powder according to the present invention, the coefficient of variation of a particle size distribution expressed in the following formula [1] is preferably not more than 0.65:

$$\text{coefficient of variation of particle size distribution} = (d_{84\%} - d_{16\%})/(2 \times \text{average particle diameter}) \quad [1]$$

where $d_{84\%}$ and $d_{16\%}$ represent particle sizes exhibiting cumulative frequencies of 84% and 16% in a frequency distribution obtained by laser diffraction scattering respectively.

In the phenol resin powder according to the present invention, the sphericity of the particles is preferably at least 0.5.

In the phenol resin powder according to the present invention, further, the free phenol content is preferably not more than 1000 ppm. The definitions of the aforementioned terms "sphericity" and "free phenol content" are described later. More preferably, the average particle diameter is not more than 10 μm, the coefficient of variation of the particle size distribution expressed in the above formula [1] is not more than 0.65, the sphericity is at least 0.5, and the free phenol content is not more than 1000 ppm in the phenol resin powder according to the present invention.

The present invention also provides a method for producing a phenol resin powder possessing thermofusibility and a thermosetting property, including (1) a phenol resin powder forming step of forming a phenol resin powder by reacting an aldehyde and a phenolic compound in an aqueous medium in the presence of an acidic catalyst and a protective colloidal agent, and (2) a separating-washing step of separating the phenol resin powder from the reaction liquid and washing the same. The molar concentration of the acidic catalyst in the reaction liquid is at least 2.0 mol/L. This method is suitably applied as a method for producing the aforementioned phenol resin powder according to the present invention.

Preferably, the aforementioned acidic catalyst is hydrochloric acid, and the aforementioned aldehyde is formaldehyde, paraformaldehyde or a mixture of these.

The feed molar ratio of the aforementioned phenolic compound with respect to the aforementioned aldehyde is preferably not more than 0.9. The aforementioned protective colloidal agent is preferably a water-soluble polysaccharide derivative.

The present invention further provides a phenol resin powder dispersion liquid containing any of the aforementioned phenol resin powders and water.

Effects of the Invention

According to the present invention, a phenol resin powder, possessing thermofusibility and a thermosetting property, having extremely minute particle diameters with an average particle diameter of not more than 20 μm and hardly containing secondary aggregates resulting from aggregation of these minute primary particles, i.e., having a high single particle ratio, is provided. Such a phenol resin powder according to the present invention is excellent in mixability in a case of being powder-mixed with another material. In other words, mixing with another material can be homogeneously performed in a short time. Further, the phenol resin powder according to the present invention has excellent dispersibility in water, and the obtained aqueous dispersion liquid has low viscosity also in a high-concentration region. The phenol resin powder according to the present invention having such excellent characteristics and a phenol resin powder dispersion liquid prepared by dispersing this in water can be suitably employed as additives for materials over various industrial fields such as a molding material, a paint, a refractory, papermaking, a friction material, an abrasive and an adhesive.

The present invention also provides a production method suitable for producing a phenol resin powder, possessing thermofusibility and a thermosetting property, having the aforementioned excellent characteristics. According to the inventive method for producing a phenol resin powder, a phenol resin powder having excellent characteristics can be produced with a relatively simple method, and the method according to the present invention is a method suitable for mass production.

BEST MODES FOR CARRYING OUT THE INVENTION

Phenol Resin Powder

The phenol resin powder according to the present invention is a phenol resin, possessing thermofusibility and a thermosetting property, consisting of a reaction product of a phenolic compound and an aldehyde, and characterized in that the average particle diameter of particles (also referred to as primary particles as a term with respect to secondary aggregates) is not more than 20 μm and a single particle ratio serving as an index as to the content of the secondary aggregates is at least 0.7. Thus, the average particle diameter of the phenol resin particles is set to not more than 20 μm, preferably not more than 10 μm, and the single particle ratio is set to at least 0.7, whereby mixability with another material as well as dispersibility in water, flowability (low viscosity) and mixability with another material upon preparation of a water dispersion liquid can be remarkably improved. Such a phenol resin powder according to the present invention is applicable over wide industrial fields of a molding material, a paint, a refractory, papermaking, a friction material, an abrasive and an adhesive.

Figure 1:
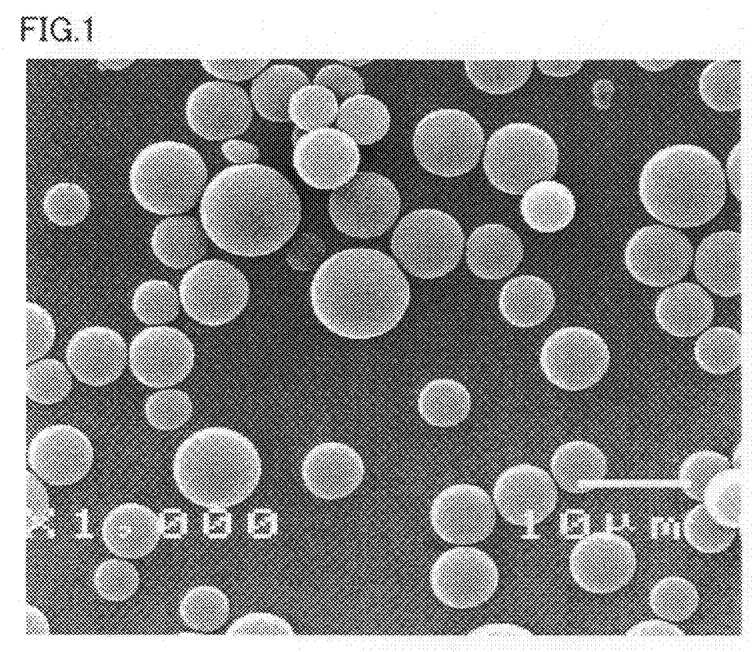
FIG. 1 is a scanning electron micrograph of a preferred example of a phenol resin powder according to the present invention.

FIG. 1 shows a scanning electron micrograph (hereinafter referred to as an SEM photograph) of a preferred example of the phenol resin powder according to the present invention. As shown in FIG. 1, the phenol resin powder according to the present invention is a phenol resin powder having minute particle diameters, and the quantity of secondary aggregates resulting from aggregation of these particles (primary particles) is small. The phenol resin powder shown in FIG. 1 is such a phenol resin powder that the average particle diameter defined below is 8 μm and the single particle ratio is 0.95.

The phenol resin powder according to the present invention is now described in detail. The phenol resin powder according to the present invention is a phenol resin, possessing thermofusibility and a thermosetting property, consisting of a reaction product of a phenolic compound and an aldehyde. While the reaction product of a phenolic compound and an aldehyde is basically a product obtained by addition reaction and condensation reaction of these, a part causing only partial addition reaction remains in the reaction product, and it follows that the phenol resin powder according to the present invention exhibits a thermosetting property by this functional group. While the phenolic compound is not particularly restricted, phenol, napthol, hydroquinone, resorcin, xylenol and pyrogallol can be listed, for example. The phenolic compound may be one type, or at least two types may be combined and employed. In particular, the phenolic compound is preferably phenol, in consideration of the balance between the performance of the obtained phenol resin and the cost. While the aldehyde is not particularly restricted, formaldehyde, paraformaldehyde, glyoxal and benzaldehyde can be listed, for example. The aldehyde may be one type, or at least two types may be combined and employed. In particular, the aldehyde is preferably formaldehyde, paraformaldehyde or a mixture of these.

In this specification, "thermofusibility" means that the phenol resin powder is fused under specific high-temperature pressurization conditions, and more specifically, the term is defined as such a property that, when about 5 g of a phenol resin powder sample is inserted between two stainless plates of 0.2 mm in thickness and pressed with a total load of 50 kg for two minutes with a pressing machine previously heated to 100° C., the phenol resin powder forms a flat plate by fusion. The phenol resin powder exhibiting the "thermofusibility" defined as such exhibits a thermosetting property at a temperature higher than 100° C., such as a temperature of at least about 120° C., for example. The "thermosetting property" means that the phenol resin powder gelates in a gel time test of 180° C.

Boiling methanol solubility of the phenol resin powder according to the present invention is preferably at least 30%. If the boiling methanol solubility is less than 30%, there is a possibility that the phenol resin powder does not exhibit sufficient thermofusibility. In this specification, "boiling methanol solubility" denotes the content of a boiling methanol soluble component in the phenol resin powder, and more specifically, the term is defined as a value calculated by the following test: In other words, 10 g of a phenol resin sample is precisely weighed, heated in about 500 mL of substantially anhydrous methanol under reflux for 30 minutes, thereafter filtrated through a glass filter of No. 3, and the residue on the glass filter is further washed with about 100 mL of anhydrous methanol. Then, the washed residue on the glass filter is dried at 40° C. for five hours, and this residue is thereafter precisely weighed. A value calculated through the following formula [2] is regarded as the "boiling methanol solubility":

boiling methanol solubility(weight %)=(difference between weight of phenol resin sample and weight of dried residue)/(weight of phenol resin sample)×100    [2]

The "boiling methanol solubility", which is not a direct criterion as to whether or not this phenol resin has "thermofusibility", can be one index for learning the degree of thermofusibility of the phenol resin. In other words, the phenol resin tends to be easily thermally fused as the "boiling methanol solubility" is increased.

The average particle diameter of the particles (primary particles) constituting the phenol resin powder according to the present invention is not more than 20 μm, preferably not more than 10 μm, as hereinabove described. The average particle diameter is so set to not more than 10 μm that mixability with another material as well as dispersibility in water, flowability (low viscosity) and mixability with another material upon preparation of a water dispersion liquid can be further improved. In this specification, "average particle diameter" denotes a particle size exhibiting a cumulative frequency of 50% in a frequency distribution obtained by a measuring method employing a laser diffraction particle size measuring apparatus, i.e., laser diffraction scattering (Microtrac method). As the laser diffraction particle size measuring apparatus, Microtrac X100 by Nikkiso Co., Ltd. can be suitably employed.

The single particle ratio of the phenol resin powder according to the present invention is at least 0.7, preferably at least 0.8. If the single particle ratio is less than 0.7, the aforementioned mixability with another material as well as the dispersibility in water, the flowability (low viscosity) and the mixability with another material upon preparation of a water dispersion liquid tend to be insufficient. In this specification, "single particles" denote primary particles not forming secondary aggregates resulting from aggregation, and "single particle ratio" denotes a ratio in a case of dispersing the phenol resin powder in water droplets, performing optical microscope observation and counting the total number of primary particles and the number of single particles in a randomly selected visual field containing about 300 primary particles, i.e., the number of single particles/the total number of primary particles.

The phenol resin powder according to the present invention preferably has a narrow particle size distribution. More specifically, the coefficient of variation of the particle size distribution of the particles (primary particles) constituting the phenol resin powder according to the present invention is preferably not more than 0.65. The coefficient of variation of the particle size distribution is more preferably not more than 0.6. The coefficient of variation of the particle size distribution is so set to not more than 0.65 that further improvement of the flowability (low viscosity) of the water dispersion liquid upon preparation of the water dispersion liquid, for example, is attained. In this specification, the "coefficient of variation of the particle size distribution" is a value calculated through the following formula [1]:

coefficient of variation of particle size distribution= $(d_{84\%}-d_{16\%})/(2\times\text{average particle diameter})$    [1]

In the above formula [1], $d_{84\%}$ and $d_{16\%}$ represent particle sizes exhibiting cumulative frequencies of 84% and 16% in a frequency distribution obtained by laser diffraction scattering respectively, and the average particle diameter is the average particle diameter defined in the above. As the laser diffraction particle size measuring apparatus, Microtrac X100 by Nikkiso Co., Ltd. can be suitably employed.

The particle shape of the phenol resin powder according to the present invention is preferably as close to a spherical shape as possible. More specifically, the sphericity is preferably at least 0.5, more preferably at least 0.7, particularly preferably at least 0.9. As the particle shape is closer to the spherical shape, i.e., as the sphericity is closer to 1.0, the mixability with another material as well as the dispersibility in water and the flowability (low viscosity) upon preparation of a water dispersion liquid are further improved. In this specification, "sphericity" denotes, when randomly deciding a visual field containing about 300 primary particles in optical microscope observation, selecting 10 primary particles having the lowest aspect ratios (i.e., ratios of minor axes/major axes) and measuring the aspect ratios in projected profiles thereof as to the respective ones of these 10 primary particles, the average of these 10 aspect ratios.

The free phenol content in the phenol resin powder according to the present invention is preferably not more than 1000 ppm. This free phenol content is more preferably not more than 500 ppm, further preferably not more than 400 ppm. The content of free phenol which is a harmful component is so set to not more than 1000 ppm that safety in handling of the phenol resin and safety of products in a case of applying this phenol resin to various products can be improved. In this specification, the "free phenol content" is defined as a value calculated by the following test: In other words, about 10 g of a phenol resin sample is precisely weighed, extracted in 190 mL of methanol under reflux for 30 minutes, and filtrated through a glass filter. The phenolic compound concentration in the filtrate is determined by liquid chromatography, and the weight of the phenolic compound in the filtrate is calculated. The ratio between the weight of this phenolic compound and the weight of the sample, i.e., the weight of the phenolic compound/the weight of the phenol resin sample is regarded as the "free phenol content".

In the phenol resin powder according to the present invention, the acidic catalyst of a high concentration is used in the reaction between the phenolic compound and the aldehyde, and hence the content of a low-molecular condensation component is extremely small and the quantity of gas generated in thermosetting is small. According to this inventive phenol resin powder, therefore, a molded substance, having high dynamic strength, overcoming problems, having generally arisen in a large number of phenol resin materials, such as cracking and swelling caused by gas resulting from condensed water formed in thermosetting can be obtained.

The phenol resin powder according to the present invention, typically thermally fused or thermally softened at a temperature of at least about 80° C., can be easily molded by compression molding or the like. Further, the phenol resin powder is thermally set typically at a temperature of at least about 120° C., more typically at a temperature of at least 150° C., so that an excellent thermoset body can be obtained.

The phenol resin powder according to the present invention exhibits excellent water dispersibility. A phenol resin powder dispersion liquid containing the phenol resin powder according to the present invention and water also belongs to the range of the present invention. The concentration of the phenol resin powder in the phenol resin powder dispersion liquid is not particularly restricted, but properly selected in response to uses of the phenol resin powder dispersion liquid in various industrial fields. The phenol resin powder dispersion liquid may contain a known additive such as a surface active agent, for example.

When making comparison on powder of the same material, the surface area per unit volume is increased as the particle size is reduced and hence the rate reaching complete wetting upon introduction into water is retarded, for example, while the phenol resin powder according to the present invention can be extremely swiftly dispersed in water, although the average particle diameter is minute. Further, the phenol resin powder according to the present invention exhibits low viscosity also in a high-concentration region upon preparation of a water dispersion liquid, due to the extremely small content of secondary aggregates. This simultaneously means that the quantity of water necessary for fluidizing the water dispersion liquid may be small. For example, the phenol resin powder according to the present invention can be slurried by adding about 50 parts by weight of water with respect to 100 parts by weight of the phenol resin powder and can form a dispersion liquid having extremely low viscosity by adding about 60 parts by weight of water, although not particularly restricted. The phenol resin powder dispersion liquid according to the present invention having these characteristics can be suitably applied to a non-organic solvent-type system in various industrial fields.

While the method for producing a phenol resin powder, possessing thermofusibility and a thermosetting property, having the aforementioned excellent characteristics is not particularly restricted, the following method can be suitably used. The following method for producing a phenol resin powder is also included in the present invention.

Method for Producing Phenol Resin Powder

The method for producing a phenol resin powder possessing thermofusibility and a thermosetting property according to the present invention includes the following steps (1) and (2). The respective steps are now described in detail.

(1) A phenol resin powder forming step of forming a phenol resin powder by reacting an aldehyde and a phenolic compound in an aqueous medium in the presence of an acidic catalyst and a protective colloidal agent, and (2) a separating-washing step of separating the phenol resin powder from the reaction liquid and washing the same.

(1) Phenol Resin Powder Forming Step

In this step, the phenol resin powder is formed by reacting the aldehyde and the phenolic compound in the aqueous medium in the presence of the acidic catalyst and the protective colloidal agent. While the aldehyde is not particularly restricted, formaldehyde, paraformaldehyde, glyoxal and benzaldehyde can be listed, for example. The aldehyde may be one type, or at least two types may be combined and employed. In particular, the aldehyde is preferably formaldehyde, paraformaldehyde or a mixture of these. While one of the features of the method according to the present invention resides in the point that the acidic catalyst of a high concentration is employed as described later, paraldehyde is depolymerized under such a condition when paraformaldehyde which is a polymer of formaldehyde is employed as the aldehyde, and hence it is conceivably formaldehyde that substantially contributes to the reaction. The type of the used aldehyde and the loading thereof are preferably so selected that the aldehyde is dissolved in the aqueous medium in the reaction.

While the phenolic compound is not particularly restricted, phenol, napthol, hydroquinone, resorcin, xylenol and pyrogallol can be listed, for example. The phenolic compound may be one type, or at least two types may be combined and employed. In particular, the phenolic compound is preferably phenol, in consideration of the balance between solubility in water and the performance of the obtained phenol resin and the cost. The type of the used phenolic compound and the loading thereof are preferably so selected that the phenolic compound is dissolved in the aqueous medium in the reaction.

More specifically, the loading (feed quantity) of the phenolic compound is preferably so selected that the concentration (weight ratio) of the phenolic compound with respect to the total weight of the reaction liquid is not more than 10 weight % when phenol or the like is employed as the phenolic compound, for example. When a phenolic compound (napthol or the like, for example) having lower solubility in water is employed, a lower concentration is desirably employed, in order to guarantee dissolution in the aqueous medium in the reaction and make the phenol resin powder exhibit excellent characteristics (a minute average particle diameter and a high single particle ratio). The "total weight of the reaction liquid" denotes the total weight of the phenolic compound, the aldehyde, the acidic catalyst, the protective colloidal agent and the aqueous medium. The concentration of the phenolic compound with respect to the total weight of the reaction liquid is so set to not more than 10 weight % that temperature control from the reaction initiating stage up to the phenol resin powder forming stage can be easily performed. In a case of initiating the reaction around ordinary temperature, for example, no excessive heat generation resulting from runaway reaction or the like is caused particularly in the initial stage of the reaction when the concentration of the phenolic compound is set to not more than 10 weight %, whereby a phenol resin powder having a small average particle diameter and inhibited from secondary aggregation can be formed while hardly performing temperature control. While the concentration (weight ratio) of the phenolic compound with respect to the total weight of the reaction liquid can be rendered higher than 10 weight %, the temperature control in the reaction must generally be properly performed in this case.

The loading (feed quantity) of the aforementioned aldehyde is preferably so selected that the feed molar ratio of the phenolic compound with respect to the aldehyde is not more than 0.9. The feed molar ratio of the phenolic compound with respect to the aldehyde is more preferably not more than 0.75, further preferably not more than 0.5. The feed molar ratio of the phenolic compound with respect to the aldehyde is so set to not more than 0.9 that a phenol resin powder having a minute average particle diameter, inhibited from secondary aggregation, closer to a spherical shape, having a narrow particle size distribution and having a small free phenol content can be formed. Further, secondary aggregation can be further suppressed by setting the feed molar ratio of the phenolic compound with respect to the aldehyde to not more than 0.75. In order to render these characteristics related to the phenol resin powder more excellent, the feed molar ratio of the phenolic compound with respect to the aldehyde is particularly preferably set to not more than 0.5. While the lower limit of the feed molar ratio of the phenolic compound with respect to the aldehyde is not particularly restricted but the feed molar ratio of the phenolic compound with respect to the aldehyde can be reduced by increasing the quantity of the aldehyde in the range dissolved in the aqueous medium, for example, the feed molar ratio of the phenolic compound with respect to the aldehyde is preferably at least 0.1, in consideration of the efficiency of the reaction.

While the aforementioned aldehyde and the phenolic compound are reacted in the aqueous medium in this step, one of the features of the production method according to the present invention resides in the point that this reaction is performed with the acidic catalyst of a high concentration. This acidic catalyst is preferably a strong acidic catalyst. For example, hydrochloric acid, phosphoric acid and sulfuric acid can be listed as such a one. In particular, hydrochloric acid is more preferable, in consideration of easiness in removal or side reaction in a case where the same remains. Acid with relatively high boiling point such as phosphoric acid or sulfuric acid can also be sufficiently used depending on the use of the phenol resin powder. The high concentration specifically means that the molar concentration of the acidic catalyst in the reaction liquid is at least 2.0 mol/L, more preferably at least 3 mol/L when the reaction is initiated around ordinary temperature. In order to obtain a phenol resin powder having a small average particle diameter and inhibited from secondary aggregation, particularly a phenol resin powder closer to a spherical shape, having a narrow particle size distribution and having a small free phenol content in addition thereto, the molar concentration of the acidic catalyst in the reaction liquid must be set to at least 2.0 mol/L when initiating the reaction around ordinary temperature. In view of a reaction rate suitable for industrial production and acid resistance of related facilities, the molar concentration of the acidic catalyst is preferably not more than 6 mol/L. The starting temperature for the reaction is so rendered higher than ordinary temperature that the molar concentration of the acidic catalyst necessary for attaining an equivalent reaction rate is slightly lower than that in a case where the reaction starting temperature is around ordinary temperature.

Another feature of the production method according to the present invention resides in the point that the reaction between the aldehyde and the phenolic compound is performed in the presence of the protective colloidal agent. The protective colloidal agent contributes to formation of the phenol resin powder. In order to form a phenol resin powder having a small average particle diameter and inhibited from secondary aggregation, particularly a phenol resin powder closer to a spherical shape, having a narrow particle size distribution and having a small free phenol content in addition thereto, it is necessary to use such a protective colloidal agent. In the present invention, a water-soluble protective colloidal agent is preferably used as the protective colloidal agent. For example, a water-soluble polysaccharide derivative can be suitably employed as the water-soluble protective colloidal agent. Specific examples of the suitably employable water-soluble polysaccharide derivative include alkaline metal salt or ammonium salt of carboxymethyl cellulose; natural starch adhesives mainly composed of a water-soluble polysaccharide derivative such as gum arabic, acacia, guar gum and locust bean gum. While the degree of carboxymethylation of cellulose is not particularly restricted when alkaline metal salt or ammonium salt of carboxymethyl cellulose is used, a product having a degree of carboxymethylation of about 75% is put on the market, and this can be suitably employed. When the protective colloidal agent is obtained as dry powder, this may be directly added to and dissolved in the reaction liquid, or an aqueous solution of the protective colloidal agent may be previously prepared and this may be added to the reaction liquid.

The loading of the aforementioned protective colloidal agent, not particularly restricted, is preferably 0.01 to 5 weight % of the loading of the aforementioned phenolic compound in solid weight. If the loading of the protective colloidal agent is less than 0.01 weight %, it is insufficient for setting the average particle diameter of the phenol resin particles to not more than 20 µm, and particle size control with another parameter such as the loading of the phenolic compound or a rate of stirring, for example, is required. In order to set the average particle diameter of the phenol resin particles to not more than 10 µm, the loading of the protective colloidal agent is preferably set to at least 0.04 weight % of the loading of the phenolic compound. It is to be specially mentioned that the average particle diameter of the phenol resin particles can be controlled by adjusting the loading of the protective colloidal agent. As the content of the protective colloidal agent is increased, phenol resin particles having a smaller average particle diameter can be produced. In a case of adding the protective colloidal agent in a quantity exceeding 1 weight % with respect to the loading of the phenolic compound, the separation rate tends to lower in the separating-washing step described later, and hence attention is required.

Depending on the type of a water-soluble polymer usable as the protective colloidal agent, ability (particle diameter reducing ability) for reducing the average particle diameter may lower by decomposing due to strong acid in the reaction liquid. Therefore, attention may be required to the serviceable life after the addition of the protective colloidal agent. When the protective colloidal agent is carboxymethyl cellulose salt, for example, the particle diameter reducing ability is reduced by half in five to 60 minutes.

While water or a mixed solvent of water and an aqueous organic solvent can be listed as the aforementioned aqueous medium, a water solvent is preferably employed in the present invention. The loading of the aqueous medium is so selected that the concentration of the acidic catalyst is in the aforementioned range, and preferably so selected that the concentration of the phenolic compound is further in the aforementioned preferable range.

Specific methods for performing reaction with the aforementioned aldehyde, the phenolic compound, the acidic catalyst and the protective colloidal agent are now described. The following two methods can be listed as the specific methods for the reaction: (i) A method of preparing a mixed liquid by mixing the acidic catalyst, the protective colloidal agent and the aldehyde into the aqueous medium and thereafter adding the phenolic compound while stirring the mixed liquid, and (ii) a method of preparing a mixed liquid by mixing the protective colloidal agent, the aldehyde and the phenolic compound into the aqueous medium and thereafter adding the acidic catalyst while stirring the mixed liquid.

In each of the aforementioned methods (i) and (ii), the aforementioned mixed liquid is preferably a substantially homogeneous solution. In other words, the solutes mixed into the aqueous medium are preferably completely dissolved, or at least substantially completely dissolved. In the preparation of the mixed liquid, the order of mixing is not particularly restricted. The temperature for initiating the reaction of this mixed liquid, not particularly restricted, is preferably about 10 to 50° C., more preferably about 20 to 40° C.

In the aforementioned method (i), the reaction between the aldehyde and the phenolic compound is performed by adding the phenolic compound while stirring the aforementioned mixed liquid. The addition of the phenolic compound may be performed by directly adding the phenolic compound to the mixed liquid, or the phenolic compound may be previously dissolved in water, so that this aqueous solution is added to the mixed liquid. This reaction is preferably so controlled that the reaction temperature is about 10 to 60° C., preferably about 20 to 50° C. The reaction rate tends to be small if the reaction temperature is less than about 10° C., while there is a possibility that the phenol resin is hardened if the reaction temperature exceeds 60° C. The temperature for initiating the reaction of the aforementioned mixed liquid is so set to about 20 to 30° C. around ordinary temperature and the concentration of the phenolic compound with respect to the total weight of the reaction liquid is so set to not more than 10 weight % as to cause no excessive heat generation, whereby the reaction can be performed in the aforementioned preferable temperature range while hardly performing temperature control.

In the aforementioned method (ii), the reaction between the aldehyde and the phenolic compound is performed by adding the acidic catalyst while stirring the aforementioned mixed liquid. The addition of the acidic catalyst may be performed at once, or may be performed by dropping over a constant time. Further, the addition of the acidic catalyst may be performed by directly adding the acidic catalyst to the mixed liquid, or the acidic catalyst may be diluted with water, so that the diluted solution of the catalyst is added to the mixed liquid. The reaction temperature is preferably controlled to be about 10 to 60° C., preferably about 20 to 50° C., similarly to the case of the aforementioned (i).

While the reaction liquid is gradually clouded (suspended) and the phenol resin powder is formed as the reaction progresses in each of the aforementioned methods (i) and (ii), such clouding typically takes place after several 10 seconds to several minutes after the addition of the phenolic compound or the acidic catalyst. There is such a tendency that the time required for the clouding, i.e., precipitation of the phenol resin particles is shorter in the method (ii) than the method (i). While it has been necessary to stop stirring after precipitation of the phenol resin particles in the method described in the aforementioned Patent Document 1 in order to prevent the particles from aggregating into the form of sticky clumps, the stirring can be continuously performed as such also after precipitation of the phenol resin particles according to the inventive production method employing the protective colloidal agent. According to the inventive production method, therefore, the temperature of the reaction liquid can be more strictly controlled, and hence the degree of polymerization and the degree of crosslinking of the phenol resin can be more strictly controlled. In other words, the reaction progresses with heat generation, and hence the phenol resin can be set to an arbitrary degree of polymerization by monitoring the temperature of the reaction liquid.

While the reaction liquid typically turns pale pink to dark pink after the clouding, the reaction is preferably continued until such coloring is observed in the present invention. The time up to the coloring after the clouding is about several 10 minutes to several hours. More typically, a phenol resin powder possessing thermofusibility and a thermosetting property can be obtained within one hour from the reaction initiation even if the reaction is initiated from ordinary temperature. Such shortness of the reaction time brings about improvement of productivity.

A phenol resin powder possessing thermofusibility and a thermosetting property can be obtained in the aforementioned manner. The thermofusibility and the thermosetting property mentioned here denote the "thermofusibility" and the "thermosetting property" defined in the above.

(2) Separating-Washing Step

In this step, the obtained phenol resin powder is separated from the reaction liquid and washed. Filtration or compression, for example, can be suitably employed as the separating method. As an apparatus for such a separating operation, a filter, a centrifugal dehydrator, a belt press or a filter press can be employed, for example. A separating method utilizing evaporation such as reduced-pressure distillation or spray drying has a possibility of damaging the apparatus due to the reaction liquid containing the acidic catalyst of the high concentration, and is hence unfavorable. When performing the separating operation by filtration, a filter aid such as diatomaceous earth or a flocculant may be employed. The phenol resin powder according to the present invention has specific gravity of about 1.2 to 1.3 and sediments by still standing, and hence a preliminary operation such as decantation may be performed in advance of this separating operation.

Then, the separated phenol resin powder is washed. The reaction substantially completely terminates by this washing operation. As a specific method for the washing, (i) a method of adding a washing solution to a phenol resin cake separated by the aforementioned separating operation (pouring the washing solution on the separated phenol resin cake on the filter and removing the washing solution by gas purge or suction, for example), or (ii) a method of dispersing the separated phenol resin cake in the washing solution and thereafter performing the separating operation again can be listed, for example. As the washing solution, water can be suitably employed. The acidic component can be removed from the phenol resin cake by washing the same with water.

As a part of the washing operation, or in place of the aforementioned washing operation with water, neutralization reaction may be performed by bringing the phenol resin cake into contact with an aqueous solution exhibiting basicity. The neutralization reaction is so performed that the acidic catalyst component contained in the phenol resin cake can be effectively removed. As the aqueous solution exhibiting basicity employed for the neutralization reaction, an organic or inorganic weak basic solution is preferably employed. When employing a strong basic rich solution, there is a possibility that the phenol resin particles are discolored or dissolved. As the weak basic solution, a diluted solution of ammonia can be suitably employed, for example. This is because, when employing the diluted solution of ammonia, formed salt is water-soluble and hence this salt can be removed by water washing while the ammonia itself can be sublimated/removed by heating.

The washed phenol resin powder can be used in the hydrous state without being dried, and such a phenol resin powder containing water and possessing thermofusibility and a thermosetting property also belongs to the range of the present invention. For example, such a hydrous phenol resin powder can be used in a case of preparing a phenol resin powder dispersion liquid or the like by dispersing the same in water. Alternatively, a drying step may be provided after the washing step. While the method of drying is not particularly restricted, a method employing a tray type static dryer, a flash dryer or a fluidized-bed dryer can be listed, for example. Drying is so performed that a phenol resin powder exhibiting excellent fluidity with a water content of not more than about 5% can be obtained. While a phenol resin powder having a high single particle ratio can be obtained according to the inventive method by performing slight pulverizing if necessary, the single particle ratio may be further improved with a pulverizer or the like in or after the aforementioned drying step.

According to the aforementioned inventive method for producing a phenol resin powder, a thermofusible and thermosetting phenol resin powder having an average particle diameter of not more than 20 µm, particularly not more than 10 µm and a single particle ratio of at least 0.7 can be produced by a relatively simple method and by a method suitable for mass production. Further, a phenol resin powder having these characteristics as well as having a narrow particle size distribution, having spherical particles and having an extremely small free phenol content can be produced.

While the present invention is now described in more detail with reference to Examples, the present invention is not restricted to these.

Preparation of Phenol Resin Powder

Example 1

A homogeneous solution was obtained by preparing 2000 g of a mixed solution having a formaldehyde concentration of 10 weight % and a hydrochloric acid concentration of 16 weight % by employing hydrochloric acid of 35 weight % and a formaldehyde aqueous solution of 36 weight %, thereafter adding 8 g of an aqueous solution of 2 weight % of carboxymethyl cellulose sodium salt to the mixed solution and stirring the same. Then, the temperature of the homogeneous solution was adjusted to 20° C., and 70 g of phenol of 95 weight % of 30° C. was thereafter added while stirring the same. The concentration of the phenolic compound with respect to the total weight of the reaction liquid is 3.2 weight %, the feed molar ratio of the phenol with respect to the formaldehyde is 0.11, and the molar concentration of the hydrochloric acid in the reaction liquid is 4.7 mol/L. The reaction liquid was clouded in about 120 seconds from the addition of the phenol. When the reaction was continued also after the clouding while reducing the rate of stirring, the reaction liquid was colored pale pink after about 30 minutes from the addition of the phenol. At this time, the temperature of the reaction liquid had reached 30° C. Then, this reaction liquid was filtrated, and the obtained cake was washed with 500 g of water, thereafter suspended in 500 g of an ammonia solution of 0.5 weight %, and subjected to neutralization reaction at 40° C. for one hour. 78 g of a pale yellow phenol resin powder was obtained by suction filtration of this suspension with an aspirator after the neutralization reaction, washing the same with 500 g of water and drying the same with a dryer of 50° C. for 10 hours.

Example 2

A phenol resin powder was obtained by performing reaction similarly to Example 1, except that the formaldehyde concentration in the mixed liquid was set to 18 weight % and the hydrochloric acid concentration was set to 18 weight %. The concentration of the phenolic compound with respect to the total weight of the reaction liquid is 3.2 weight %, the feed molar ratio of the phenol with respect to the formaldehyde is 0.06, and the molar concentration of the hydrochloric acid in the reaction liquid is 5.3 mol/L. The reaction liquid was clouded after about 150 seconds from addition of the phenol, and there was no problem in operation such as adhesion of the resin to a vessel wall or the like either.

Example 3

Figure 2:
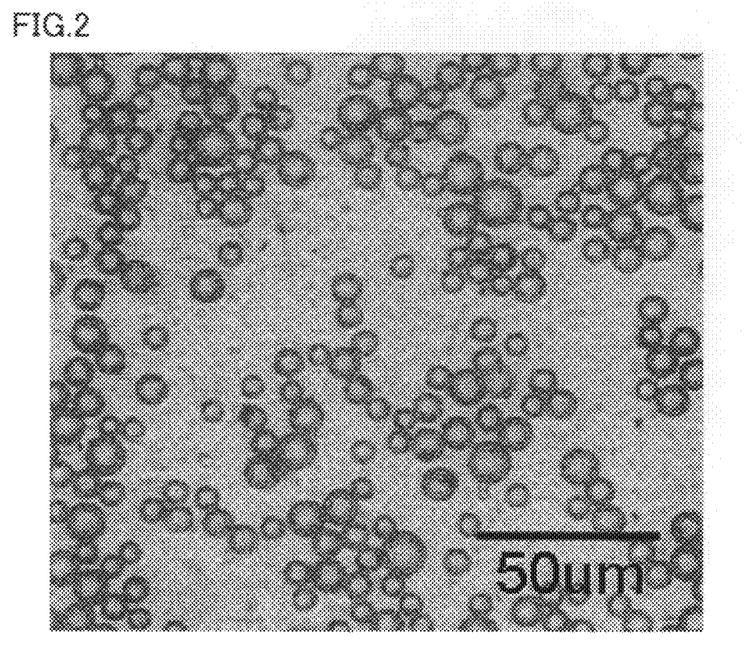
FIG. 2 is an optical micrograph of a phenol resin powder obtained in Example 3.

A phenol resin powder was obtained by performing reaction similarly to Example 1, except that the formaldehyde concentration in the mixed liquid was set to 7 weight % and the hydrochloric acid concentration was set to 20 weight %. The concentration of the phenolic compound with respect to the total weight of the reaction liquid is 3.2 weight %, the feed molar ratio of the phenol with respect to the formaldehyde is 0.15, and the molar concentration of the hydrochloric acid in the reaction liquid is 5.9 mol/L. The reaction liquid was clouded after about 30 seconds from addition of the phenol, and there was no problem in operation such as adhesion of the resin to a vessel wall or the like either. FIG. 2 shows an optical micrograph of the phenol resin powder according to this Example.

Example 4

Figure 3:
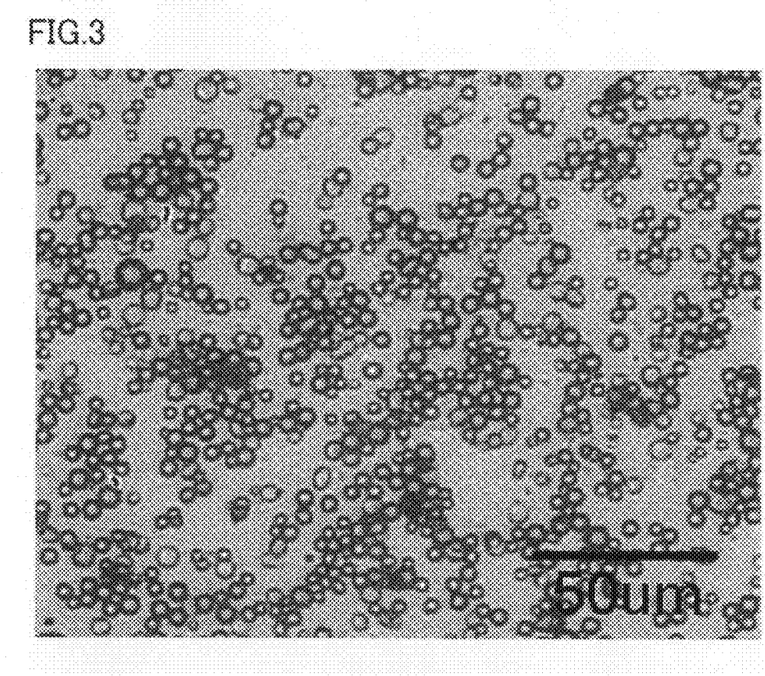
FIG. 3 is an optical micrograph of a phenol resin powder obtained in Example 4.

60 g of a phenol resin powder was obtained by performing reaction similarly to Example 1, except that the phenol of 95 weight % was added by 52 g. The concentration of the phenolic compound with respect to the total weight of the reaction liquid is 2.4 weight %, the feed molar ratio of the phenol with respect to the formaldehyde is 0.08, and the molar concentration of the hydrochloric acid in the reaction liquid is 4.8 mol/L. FIG. 3 shows an optical micrograph of the phenol resin powder according to this Example.

Example 5

120 g of a phenol resin powder was obtained by performing reaction similarly to Example 1, except that the phenol of 95 weight % was added by 105 g. The concentration of the phenolic compound with respect to the total weight of the reaction liquid is 4.7 weight %, the feed molar ratio of the phenol with respect to the formaldehyde is 0.16, and the molar concentration of the hydrochloric acid in the reaction liquid is 4.6 mol/L.

Example 6

A homogeneous solution was obtained by preparing 1156 g of a mixed solution by mixing 556 g of a formaldehyde solution of 36 weight %, 70 g of phenol of 95 weight % and 530 g of water with each other, thereafter adding 8 g of an aqueous solution of 2 weight % of carboxymethyl cellulose sodium salt to the mixed solution and stirring the same. Then, the temperature of the homogeneous solution was adjusted to 20° C., and 914 g of hydrochloric acid of 35 weight % of 30° C. was thereafter added while stirring the same. The concentration of the phenolic compound with respect to the total weight of the reaction liquid is 3.2 weight %, the feed molar ratio of the phenol with respect to the formaldehyde is 0.11, and the molar concentration of the hydrochloric acid in the reaction liquid is 4.7 mol/L, identically to Example 1. The reaction liquid was clouded in about 20 seconds from the addition of the hydrochloric acid. When the reaction was continued also after the clouding, the reaction liquid was colored pink after about 30 minutes from the addition of the hydrochloric acid. Thereafter 75 g of a phenol resin powder was obtained by performing separation, washing and drying similarly to Example 1.

Example 7

230 g of a phenol resin powder was obtained by performing reaction similarly to Example 6, except that the phenol of 95 weight % was employed by 204 g. The concentration of the phenolic compound with respect to the total weight of the reaction liquid is 8.8 weight %, the feed molar ratio of the phenol with respect to the formaldehyde is 0.31, and the molar concentration of the hydrochloric acid in the reaction liquid is 4.4 mol/L.

Example 8

220 g of a phenol resin powder was obtained by performing reaction similarly to Example 6, except that 278 g of a formaldehyde solution of 36 weight %, 204 g of phenol of 95 weight % and 803 g of water were employed for preparing the mixed liquid. The concentration of the phenolic compound with respect to the total weight of the reaction liquid is 8.8 weight %, the feed molar ratio of the phenol with respect to the formaldehyde is 0.62, and the molar concentration of the hydrochloric acid in the reaction liquid is 4.4 mol/L.

Example 9

Reaction was performed similarly to Example 1, except that a paraformaldehyde solution of the same weight concentration was employed in place of employing the formaldehyde solution of 36 weight %. The course of the reaction was substantially identical to that in Example 1, and 75 g of a phenol resin powder was obtained.

Example 10

A phenol resin powder was obtained by performing reaction similarly to Example 1, except that the hydrochloric acid concentration in the mixed solution was set to 8 weight % and the reaction liquid was heated to 50° C. by external heating after addition of phenol of 95 weight %. The concentration of the phenolic compound with respect to the total weight of the reaction liquid is 3.2 weight %, the feed molar ratio of the phenol with respect to the formaldehyde is 0.11, and the molar concentration of the hydrochloric acid in the reaction liquid is 2.3 mol/L.

Example 11

A homogeneous solution was obtained by preparing 2000 g of a mixed solution having a formaldehyde concentration of 8 weight % and a hydrochloric acid concentration of 18 weight % by employing hydrochloric acid of 35 weight % and a formaldehyde aqueous solution of 36 weight %, thereafter adding 5 g of an aqueous solution of 20 weight % of gum arabic to the mixed solution and stirring the same. Then, the temperature of the homogeneous solution was adjusted to 20° C., 52 g of phenol of 95 weight % of 30° C. was thereafter added while stirring the same, and reaction and a post-treatment were performed similarly to Example 1, to obtain 58 g of a pale yellow phenol resin powder. The concentration of the phenolic compound with respect to the total weight of the reaction liquid is 2.4 weight %, the feed molar ratio of the phenol with respect to the formaldehyde is 0.098, and the molar concentration of the hydrochloric acid in the reaction liquid is 5.3 mol/L.

Comparative Example 1

Figure 4:
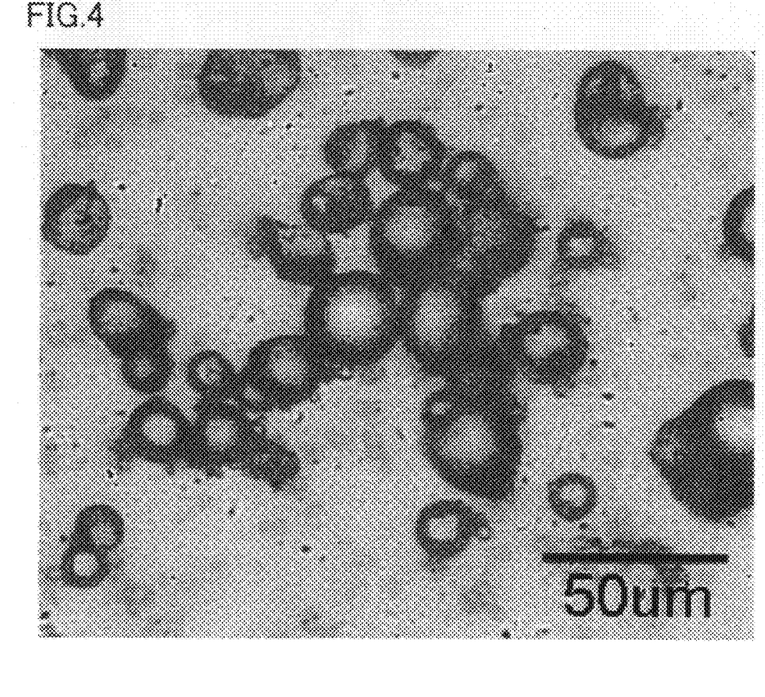
FIG. 4 is an optical micrograph of a phenol resin powder obtained in Comparative Example 1.

79 g of a phenol resin powder was obtained by performing reaction similarly to Example 1, except that 8 g of water was employed in place of 8 g of the aqueous solution of 2 weight % of carboxymethyl cellulose sodium salt. The course of the reaction was similar to that in Example 1, except that the reaction liquid was clouded after, about 95 seconds after addition of the phenol. FIG. 4 shows an optical micrograph of the phenol resin powder according to this comparative example.

Comparative Example 2

Reaction was performed similarly to Example 1, except that the hydrochloric acid concentration in 2000 g of the mixed solution was set to 5 weight %. No clouding of the reaction liquid was observed, and no phenol resin powder was obtained. The molar concentration of the hydrochloric acid in the reaction liquid is 1.5 mol/L.

Comparative Example 3

200 g of a phenol resin powder was obtained by performing reaction similarly to Example 6, except that 140 g of a formaldehyde aqueous solution of 36 weight %, 204 g of phenol of 95 weight % and 940 g of water were employed for preparing the mixed liquid. The concentration of the phenolic compound with respect to the total weight of the reaction liquid is 8.8 weight %, the feed molar ratio of the phenol with respect to the formaldehyde is 1.23, and the molar concentration of the hydrochloric acid in the reaction liquid is 4.4 mol/L.

As to the phenol resin powders of the aforementioned Examples 1 to 11 and Comparative Examples 1 to 3, the characteristics mentioned below were measured. Measurement methods and measurement conditions are as follows. Table 1 shows the results of the measurement along with reaction conditions.

(1) Thermofusibility: When inserting about 5 g of a phenol resin powder sample between two stainless plates of 0.2 mm in thickness and pressing the same with a pressing machine previously heated to 100° C. with a total load of 50 kg for two minutes, a case where the phenol resin powder formed a flat plate by fusion and/or welding was determined as having the "thermofusibility".

(2) Boiling Methanol Solubility: About 10 g of a phenol resin sample is precisely weighed, heated in about 500 mL of substantially anhydrous methanol under reflux for 30 minutes, thereafter filtrated through a glass filter of No. 3, and the residue on the glass filter is washed with about 100 mL of anhydrous methanol. Then, the washed residue on the glass filter is dried at 40° C. for five hours, and this residue is thereafter precisely weighed. From the weight of the dried residue as obtained and the weight of the phenol resin sample, the boiling methanol solubility is calculated on the basis of the following formula:

boiling methanol solubility(weight %)=(difference between weight of phenol resin sample and weight of dried residue)/(weight of phenol resin sample)×100

(3) Thermosetting Property: A case of gelating in a gel time test of 180° C. was determined as having the "thermosetting property".

(4) Average Particle Diameter: A particle size exhibiting a cumulative frequency of 50% in a frequency distribution measured with a laser diffraction particle size measuring apparatus (Microtrac X100 by Nikkiso Co., Ltd.) while preparing a water dispersion liquid with the phenol resin powder.

(5) Single Particle Ratio: A ratio in a case of dispersing the phenol resin powder in water droplets, performing observation with an optical microscope and counting the total number of primary particles and the number of single particles in a randomly selected visual field containing about 300 primary particles, i.e., the number of single particles/the total number of primary particles.

(6) Coefficient of Variation of Particle Size Distribution: Calculated according to the following formula [1] from a frequency distribution measured with the laser diffraction particle size measuring apparatus (Microtrac X100 by Nikkiso Co., Ltd.) while preparing the water dispersion liquid with the phenol resin powder:

coefficient of variation of particle size distribution= $(d_{84\%}-d_{16\%})/(2\times \text{average particle diameter})$  [1]

In the above formula [1], $d_{84\%}$ and $d_{16\%}$ represent particle sizes exhibiting cumulative frequencies of 84% and 16% in the obtained frequency distribution respectively. The phenol resin powder was determined as having a narrow particle size distribution when the coefficient of variation was not more than 0.65.

(7) Sphericity: In a case of randomly deciding a visual field containing about 300 primary particles in observation with an optical microscope, selecting 10 primary particles having the lowest aspect ratios (i.e., ratios of minor axes/major axes) and measuring aspect ratios in projected profiles thereof as to the respective ones of these 10 primary particles, the average of these 10 aspect ratios.

Figure 5:
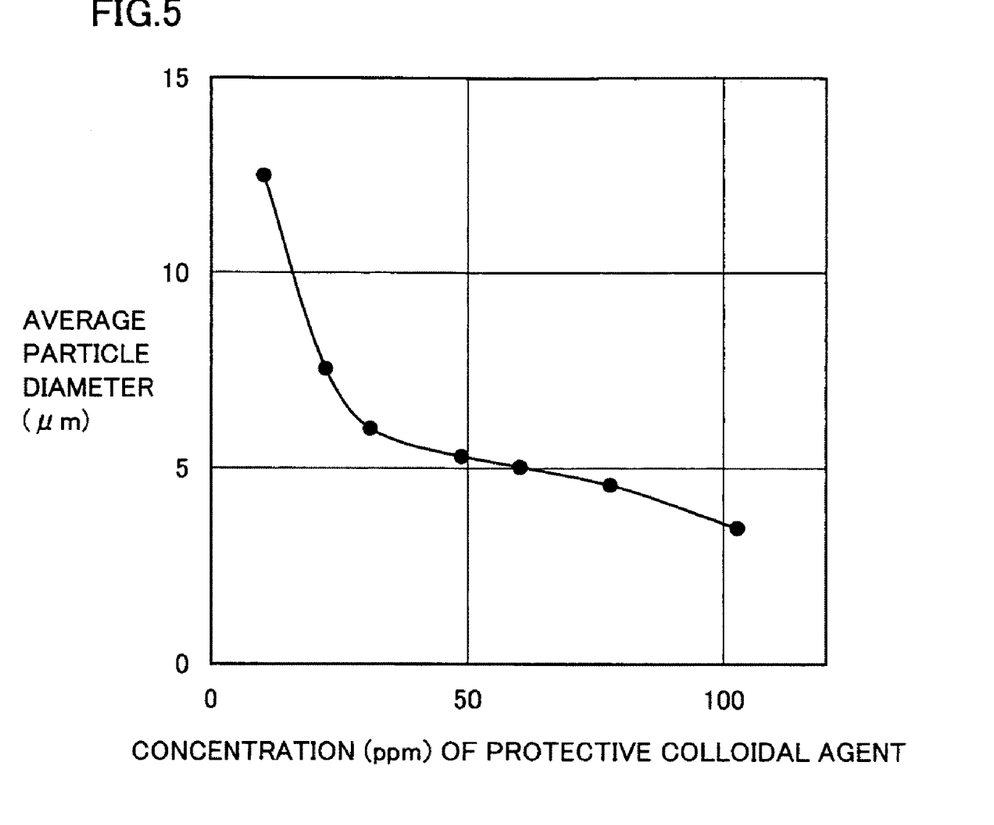
FIG. 5 is a graph showing the relation between the concentration of a protective colloidal agent (weight (ppm) of the protective colloidal agent with respect to the total weight of a reaction liquid) and the average particle diameter of a phenol resin powder.

(8) Free Phenol Content: Defined as a value calculated by the following test: In other words, about 10 g of a phenol resin sample is precisely weighed, extracted in 190 mL of methanol under reflux for 30 minutes, and filtrated through a glass filter. The phenolic compound concentration in the filtrate is determined by liquid chromatography, and the weight of the phenolic compound in the filtrate is calculated. The ratio between this weight of the phenolic compound and the weight of the sample, i.e., the weight of the phenolic compound/the weight of the phenol resin sample is regarded as the "free phenol content".

in FIG. 5, it has been recognized that the average particle diameter of the obtained phenol resin powder can be controlled by adjusting the loading of the protective colloidal agent. In other words, it has been recognized that the average particle diameter can be reduced by increasing the loading of the protective colloidal agent.

Rate of Water Dispersion of Phenol Resin Powder

Example 13

When 40 g of the phenol resin powder obtained in Example 1 was introduced into 60 g of water at once while stirring the same, the time required for forming a homogeneous dispersion liquid from the introduction of the phenol resin powder was two seconds.

Comparative Example 4

When an operation similar to that in Example 13 was performed except that the phenol resin powder obtained in Comparative Example 1 was employed, the time required for forming a homogeneous dispersion liquid from the introduction of the phenol resin powder was eight seconds, and a large quantity of foaming was observed.

TABLE 1

| | Reaction Condition | | | | | | | | | | |
|---|---|---|---|---|---|---|---|---|---|---|---|
| | Phenol Concentration *1 (weight %) | P/A *2 (molar ratio) | Hydrochloric Acid Concentration *3 (mol/L) | Thermofusibility (yes/no) | Boiling Methanol Solubility (weight %) | 180° C. Gel Time (seconds) | Average Particle Diameter (μm) | Single Particle Ratio | Coefficient of Variation | Sphericity | Free Phenol Content (ppm) |
| Example 1 | 3.2 | 0.11 | 4.7 | yes | 65 | 55 | 5 | 0.99 | 0.48 | 0.96 | 180 |
| Example 2 | 3.2 | 0.06 | 5.3 | yes | 90 | 20 | 4 | 0.99 | 0.40 | 0.98 | 120 |
| Example 3 | 3.2 | 0.15 | 5.9 | yes | 65 | 30 | 7 | 0.80 | 0.49 | 0.90 | 400 |
| Example 4 | 2.4 | 0.08 | 4.8 | yes | 80 | 60 | 3 | 1.00 | 0.35 | 0.98 | 70 |
| Example 5 | 4.7 | 0.16 | 4.6 | yes | 95 | 70 | 7 | 0.84 | 0.52 | 0.80 | 350 |
| Example 6 | 3.2 | 0.11 | 4.7 | yes | 47 | 20 | 2 | 0.99 | 0.40 | 0.97 | 30 |
| Example 7 | 8.8 | 0.31 | 4.4 | yes | 58 | 30 | 2 | 0.99 | 0.42 | 0.96 | 80 |
| Example 8 | 8.8 | 0.62 | 4.4 | yes | 70 | 200 | 6 | 0.80 | 0.51 | 0.99 | 280 |
| Example 9 | 3.2 | 0.11 | 4.7 | yes | 65 | 60 | 5 | 0.99 | 0.55 | 0.99 | 200 |
| Example 10 | 3.2 | 0.11 | 2.3 | yes | 80 | 300 | 18 | 0.70 | 0.60 | 0.85 | 450 |
| Example 11 | 2.4 | 0.098 | 5.3 | yes | 55 | 40 | 1 | 1.00 | 0.35 | 0.99 | 20 |
| Comparative Example 1 | 3.2 | 0.11 | 4.7 | yes | 75 | 55 | 24 | 0.55 | 0.69 | 0.60 | 120 |
| Comparative Example 2 | 3.2 | 0.11 | 1.5 | — | — | — | — | — | — | — | — |
| Comparative Example 3 | 8.8 | 1.23 | 4.4 | yes | 90 | not gelating | 5 | 0.70 | 0.60 | 0.99 | 1500 |

*1: concentration (weight %) of phenolic compound with respect to total weight of reaction liquid.
*2: feed molar ratio of phenolic compound with respect to aldehyde.
*3: molar concentration of hydrochloric acid in reaction liquid.

Example 12

After obtaining phenol resin powders by performing reaction similarly to Example 1 except that the quantity of carboxymethyl cellulose sodium salt which is a protective colloidal agent with respect to phenol was changed in various ways, the average particle diameter of each phenol resin powder was measured. FIG. 5 is a graph showing the relation between the concentration of the protective colloidal agent (weight (ppm) of the protective colloidal agent with respect to the total weight of the reaction liquid) and the average particle diameter of the phenol resin powder. The measurement range of 13 to about 103 ppm of the protective colloidal agent concentration corresponds to the range of 0.04 to 0.32 weight % in terms of the ratio (weight %) of the loading of the protective colloidal agent/the loading of the phenol. As shown The embodiment and Examples disclosed this time are to be considered as illustrative in all points and not restrictive. The range of the present invention is shown not by the above description but by the scope of claims for patent, and it is intended that all modifications within the meaning and range equivalent to the scope of claims for patent are included.

The invention claimed is:

1. A phenol resin powder, possessing thermofusibility and a thermosetting property, having an average particle diameter of not more than 20 μm and a single particle ratio of at least 0.7,
wherein the coefficient of variation of a particle size distribution expressed in the following formula [1] is not more than 0.65:

coefficient of variation of particle size distribution= $(d_{84\%} - d_{16\%})/(2 \times \text{average particle diameter})$ [1]

where $d_{84\%}$ and $d_{16\%}$ represent particle sizes exhibiting cumulative frequencies of 84% and 16% in a frequency distribution obtained by laser diffraction scattering respectively.

2. The phenol resin powder according to claim 1, wherein the average particle diameter is not more than 10 μm.

3. The phenol resin powder according to claim 1, wherein the sphericity is at least 0.5.

4. The phenol resin powder according to claim 1, wherein the free phenol content is not more than 1000 ppm.

5. The phenol resin powder according to claim 2, wherein the coefficient of variation of the particle size distribution expressed in said formula [1] is not more than 0.65, the sphericity is at least 0.5, and the free phenol content is not more than 1000 ppm.

6. A method for producing the phenol resin powder according to claim 1, including:

(1) a phenol resin powder forming step of forming a phenol resin powder by reacting an aldehyde and a phenolic compound in an aqueous medium in the presence of an acidic catalyst having a molar concentration of at least 2.0 mol/L in a reaction liquid and a protective colloidal agent; and (2) a separating-washing step of separating said phenol resin powder from the reaction liquid and washing the same.

7. The method for producing a phenol resin powder according to claim 6, wherein
said acidic catalyst is hydrochloric acid, and said aldehyde is formaldehyde, paraformaldehyde or a mixture of these.

8. The method for producing a phenol resin powder according to claim 6, wherein
the feed molar ratio of said phenolic compound with respect to said aldehyde is not more than 0.9.

9. The method for producing a phenol resin powder according to claim 6, wherein said protective colloidal agent is a water-soluble polysaccharide derivative.

10. A phenol resin powder dispersion liquid containing the phenol resin powder according to claim 1 and water.

11. A phenol resin powder dispersion liquid containing the phenol resin powder according to claim 5 and water.

* * * * *

UNITED STATES PATENT AND TRADEMARK OFFICE
Certificate

Patent No. 8,362,187 B2                                                                                     Patented: January 29, 2013

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Naoto Yoshinaga, Hofu (JP); Yoshiharu Wakayama, Hofu (JP); and Satoshi Ibaraki, Osaka (JP).

Signed and Sealed this Seventh Day of January 2014.

RANDY GULAKOWSKI
Supervisory Patent Examiner
Art Unit 1766
Technology Center 1700